United States Patent [19]

Dendy et al.

[11] 3,916,688
[45] Nov. 4, 1975

[54] VTOL CRAFT DECELERATION CONTROL SYSTEM

[75] Inventors: John C. Dendy, Phoenix; Ronald J. Miller, Glendale, both of Ariz.

[73] Assignee: Sperry Rand Corporation, New York, N.Y.

[22] Filed: Feb. 28, 1972

[21] Appl. No.: 229,928

[52] U.S. Cl. .......................... 73/178 T; 235/150.22
[51] Int. Cl.² ......................................... G01C 21/10
[58] Field of Search .......... 73/178 R, 178 T, 178 H, 73/101; 343/108 R; 247/77 D, 77 A; 235/15.22

[56] References Cited
UNITED STATES PATENTS

| | | | |
|---|---|---|---|
| 3,265,333 | 8/1966 | Montooth | 247/77 A |
| 3,307,191 | 2/1967 | Crane | 343/108 R |
| 3,577,195 | 5/1971 | Clift | 343/108 R |
| 3,652,835 | 3/1972 | Devlin et al. | 343/108 R |
| 3,743,221 | 7/1973 | Lykken et al. | 343/108 R |

*Primary Examiner*—Donald O. Woodiel
*Attorney, Agent, or Firm*—Howard P. Terry; Thomas J. Scott

[57] ABSTRACT

Apparatus for guiding a V/STOL type craft along a descent path in accordance with a prescribed deceleration program to a landing or hover at a given termination position, comprising means for providing a programmed airspeed signal decreasing from an initial high value commencing at some point along the descent path to a final lower value and means for comparing this programmed signal with a signal representative of actual craft speed to produce an output indicative of craft pitch attitude required to reduce the craft speed to the final value prior to reaching the termination point.

19 Claims, 8 Drawing Figures

VTOL CRAFT DECELERATION CONTROL SYSTEM

BACKGROUND OF THE INVENTION

1. Field of the Invention

The present invention relates generally to aircraft instrumentation systems and particularly to apparatus for guiding VTOL or rotary wing aircraft such as a helicopter to a landing or hover at a given position. The description provided herein of apparatus embodying the principles of the invention will be made with reference to a helicopter Flight Director apparatus but it will be apparent to those skilled in the art that the invention is also applicable to autopilot systems and other short or vertical take off and landing aircraft.

2. Description of the Prior Art

Prior art helicopter flight control systems are exemplified by U.S. Pat. Nos. 2,845,623 and 3,096,503 issued to G. E. Iddings and assigned to the instant assignee. In the former of these patents, a system is disclosed which includes provision for applying a glide slope displacement signal to both the altitude cue and the pitch bar of a Flight Director Indicator with relative amplitudes determined in accordance with the angle of the glide slope descent path. More specifically, in shallow angle descents, where the craft typically flies at high speeds, altitude control is effected by means of the collective pitch mechanism and, accordingly, the glide slope displacement signal is applied primarily to the collective altitude cue. In the case of steep descent angles, on the other hand, where the aircraft speed is comparatively low, the glide slope displacement signal is applied predominantly to the pitch bar of the Flight Director Indicator and the cyclic pitch mechanism is used to control the craft attitude in a manner to return or maintain the craft on the center line of the glide slope beam. The pitch bar is also controlled by a signal indicative of craft pitch attitude and an airspeed error signal representative of the difference between a desired or selective airspeed and the actual indicated airspeed. With regard to the airspeed control, provision is made for decreasing the desired (reference) airspeed to a high value for a shallow angle descent path and to a low value for a steep descent. In the preferred embodiment of the present invention, the glide slope displacement signal is applied only to the collective cue thereby eliminating the design and fabrication complexities associated with variably cross-coupling the displacement signal to both the collective and pitch indicators of the Flight Director Indicator. In addition, the present invention provides a predetermined deceleration program for controlling the pitch (speed control) channel in place of the mere high or low desired airspeed selection utilized in the prior art system.

The other of the aforementioned patents discloses a system in which an integrated velocity signal is used to control the collective cue of the Flight Director Indicator while the pitch bar is controlled at ranges in excess of a predetermined range from the landing position by a selected or desired airspeed signal, this signal being limited (in a variable limiter) at ranges shorter than the predetermined range by a signal proportional to the instantaneous value of range to the landing or termination position. Thus, pitch control for achieving a suitable or desired landing speed is effected by means of a limited signal, the limit on which varies in accordance with decreasing range; but no provision is made in this prior art system for varying the commanded airspeed profile as a function of time or range to assure that no unacceptable pitch transients are commanded, and to produce an instantaneous craft velocity which assures descent along a speed/altitude corridor safely outside the regions prohibited for autorotation landings. Further, no provision was included in prior art systems to insure that variations in aircraft attitude, required for equilibrium flight, i.e. trim attitude, did not produce deviations from the commanded velocity profile.

In view of the above-described limitations inherent in the prior art systems, it is accordingly a principal object of the invention to provide an improved flight control system for controlling the descent of VTOL or helicopter type craft to a landing or hovering terminal position and possessing a capability for assuring descent within prescribed safe speed/altitude conditions.

SUMMARY OF THE INVENTION

The principles of the present invention are applied to achieve the foregoing objective by providing means for varying the desired velocity in a predetermined manner commencing at some point along the descent and continuing until the craft has decelerated to a suitable comparatively low velocity at an altitude somewhat above or equal to that of the hover or landing position as required for particular applications. The deceleration control may be accomplished by either an open-loop technique in which the desired velocity is controlled so as to begin decreasing at a predetermined slant range from the termination point or alternatively by a closed-loop technique in which the desired velocity is varied according to some function of the slant range. In either case, the deceleration program may have various configurations.

A constant deceleration as a function of time is one preferred deceleration program. This may be implemented in either open-loop or closed-loop fashion and in both cases has the advantage of providing smooth transition into the deceleration program without excessive gravity loading on the craft and without requiring inordinately high initial pitch attitude excursions. Constant deceleration, however, has the effect of causing an inordinately high pitch attitude of the craft at the low velocity/low altitude conditions prevailing near the terminal point of the descent and as a result is not suitably compatible for takeover by a pilot utilizing external visual cues to perform the final hover or landing maneuver. For this reason, the constant deceleration program may desirably be combined in some instances with a variable deceleration program as will be explained more fully in the subsequent description of the preferred embodiments. Variable deceleration quite obviously causes the craft velocity to vary non-linearly with time but the preferred variable deceleration program employed in the present invention is organized so as to provide a linear variation of the velocity as a function of range. A velocity characteristic of this sort is achieved by imparting a high initial deceleration to the craft followed by a more gradual deceleration as the terminal point is approached, the initial deceleration being limited, of course, to preclude excessive gravity loading on, or pitch attitude of, the craft. The advantage of this variable deceleration program is that it results in very small pitch attitude of the craft at the terminal portion of the deceleration program and thus is conveniently suited to pilot takeover. It will be appreciated therefore that the better features of both deceleration modes can be realized by using the constant deceleration program for the initial portion of the decelerated descent and then switching over to the variable deceleration program for the terminal part, with provision made for substantial matching of the deceleration programs to accomplish the transition from one to the other smoothly without abrupt changes in pitch attitude.

DESCRIPTION OF THE PREFERRED EMBODIMENTS

Figure 1:
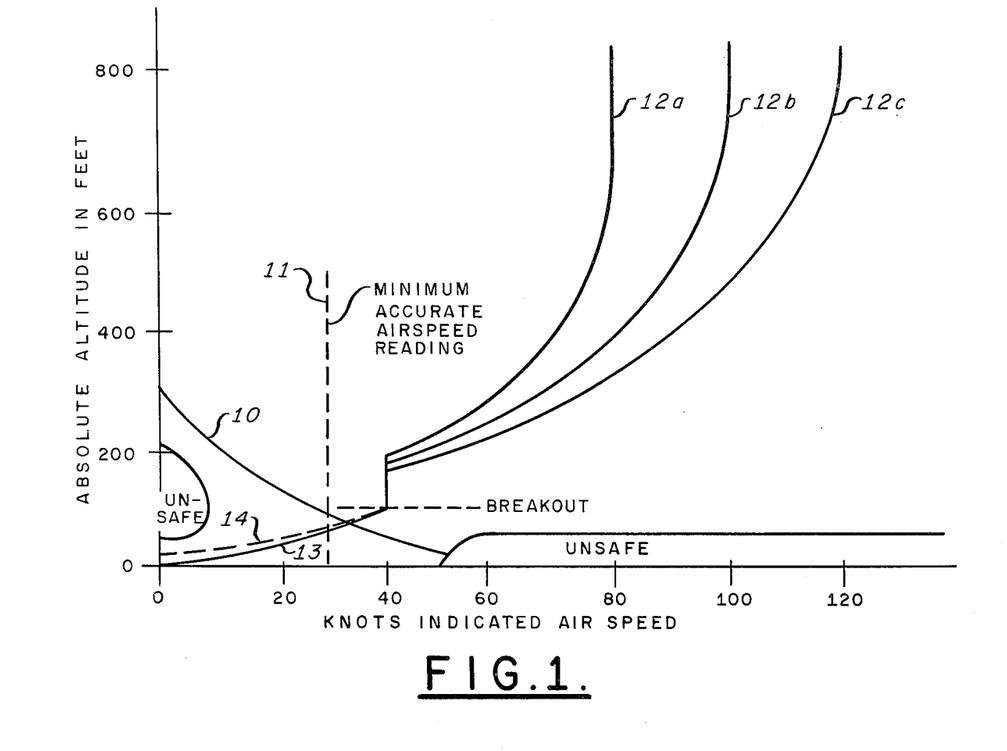
FIG. 1 is a graph of altitude versus speed for a typical two-engine helicopter, having a gross weight of approximately 18,000 pounds, depicting unsafe operating regions and various speed/altitude conditions in which the craft preferably is to be operated.

Before proceeding to a description of apparatus embodying the inventive concept, reference will be made momentarily to FIGS. 1 and 2 for the purpose of discussing the general operational features and requirements of the invention. In FIG. 1, the regions labelled "unsafe" represent the speed/altitude conditions which are unsuitable for autorotation landings of a typical craft and thus are to be avoided at all times. In other words, speeds introduced excess of 50 knots should only be flown at altitudes above approximately 50 feet while altitudes from 50 to about 200 feet should be avoided at speeds below 10 knots. The region bounded by the line 10 and the altitude and speed axes designates speed/altitude conditions which should be avoided in the case of failure of one engine of a two-engine craft and from which an immediate landing should be made in the event of such failure. Vertical line 11 in the 30 knots location simply designates a typical minimum speed at which currently available airspeed indicator devices can be relied on to provide accurate measurements of craft airspeed.

The function of the invention deceleration control system is to control the craft, after capturing a glide slope beam, from some initial altitude of about 800 feet at airspeeds illustratively depicted as 80, 100 and 120 knots, by curves 12a, b and c, respectively, down to the landing or hover position represented by the 0—0 point of the altitude and speed axes. It is seen that for each initial airspeed condition, the craft speed is decreased to a predetermined lower value, 40 knots for example, at an altitude in the range of about 150 to 200 feet and thereafter is flown at constant speed down to approximately 100 feet altitude which is assumed to be the breakout point from existing cloud cover. It is to be understood that the numerical values stated above and which will be understood occasionally hereinafter are intended merely to be illustrative of particular flight conditions which may be implemented. Below the breakout point the pilot is able, of course, to control the craft along a flight path represented by solid line 13 or dashed line 14 to a landing or hover at the termination point as desired with the aid of external visual cues. It should be understood though that instrument or automatic control may be performed right down to the terminal point; but, in such a case, velocity information which is reliable is this low speed and hover condition will be used in place of conventional airspeed data, particularly below approximately 30 knots.

Figure 2:
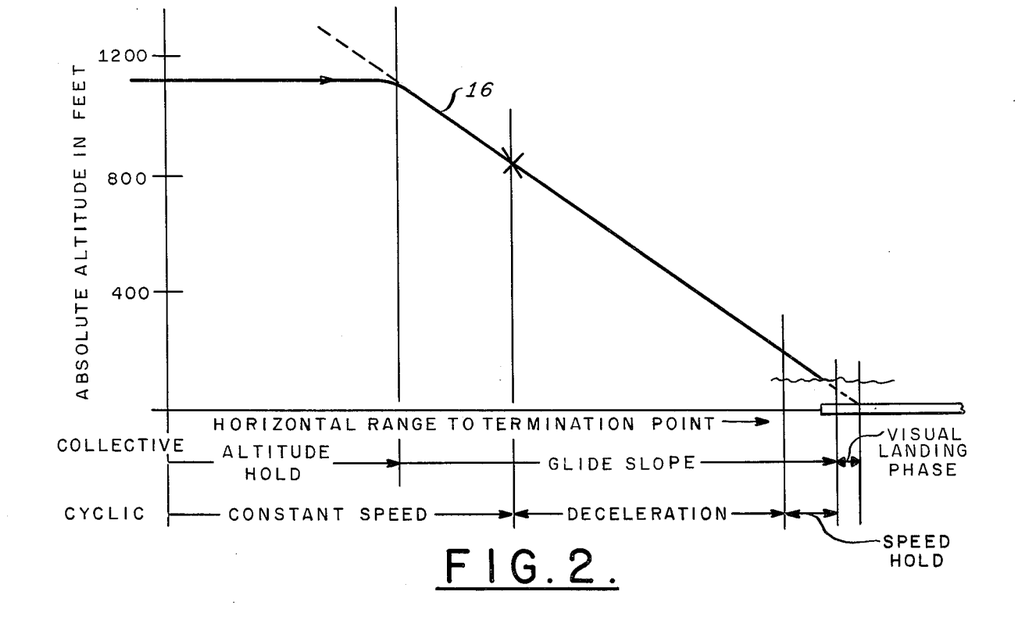
FIG. 2 depicts the glide slope on an altitude versus range graph and illustrates the operational modes of the collective and cyclic pitch mechanisms at various ranges from the hover or landing terminal point.

As shown in FIG. 2, the craft may fly at an altitude of about 1,100 feet prior to capturing and descending along the glide slope beam, the center of which is designated by line 16. Prior to encountering the glide slope beam, the vertical (collective pitch) channel of the craft may typically be operated in an altitude hold mode to fly at a constant altitude while the longitudinal (cyclic pitch) channel of the craft is operated in a constant speed mode in accordance with a speed selected by the pilot. Upon capturing the glide slope beam, the altitude hold mode is deactivated in the vertical channel which thereafter is controlled by a glide slope displacement signal. In the longitudinal channel, on the other hand, the constant speed control which is active during cruise flight continues for a short time after glide slope capture until the craft reaches a predetermined range (point X) from the terminal point. At the predetermined range, a deceleration program commences. In the course of the deceleration program, the longitudinal channel is controlled by an error signal indicative of the difference between actual craft airspeed and a varying desired airspeed. In a case where the deceleration program terminates above the cloud breakout point, the craft continues to fly at a constant low predetermined speed to an altitude below the cloud level. In reality, this is part of the profile being commanded and involves no mode switching or other signal modification or switching. Finally, in the terminal portion of the descent, collective and cyclic pitch control may be assumed by the pilot to effect the hover or landing in a so-called visual landing phase. As stated above, given reliable and accurate low-speed data, the lower limit on the speed profile could be zero knots or hover.

Figure 3A:
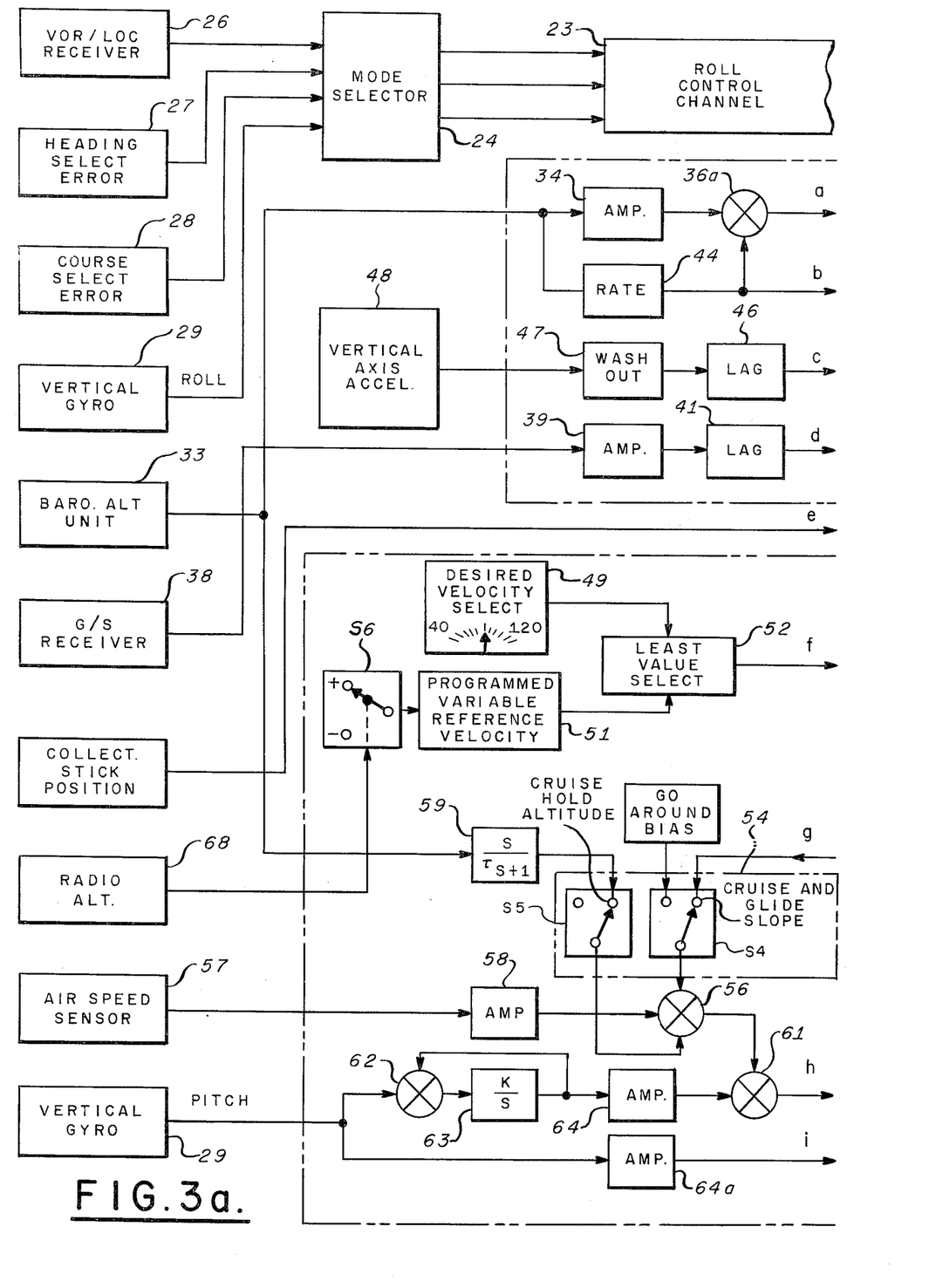
FIGS. 3a and 3b is a block diagram of a preferred embodiment incorporating the principles of the present invention.
Figure 3B:
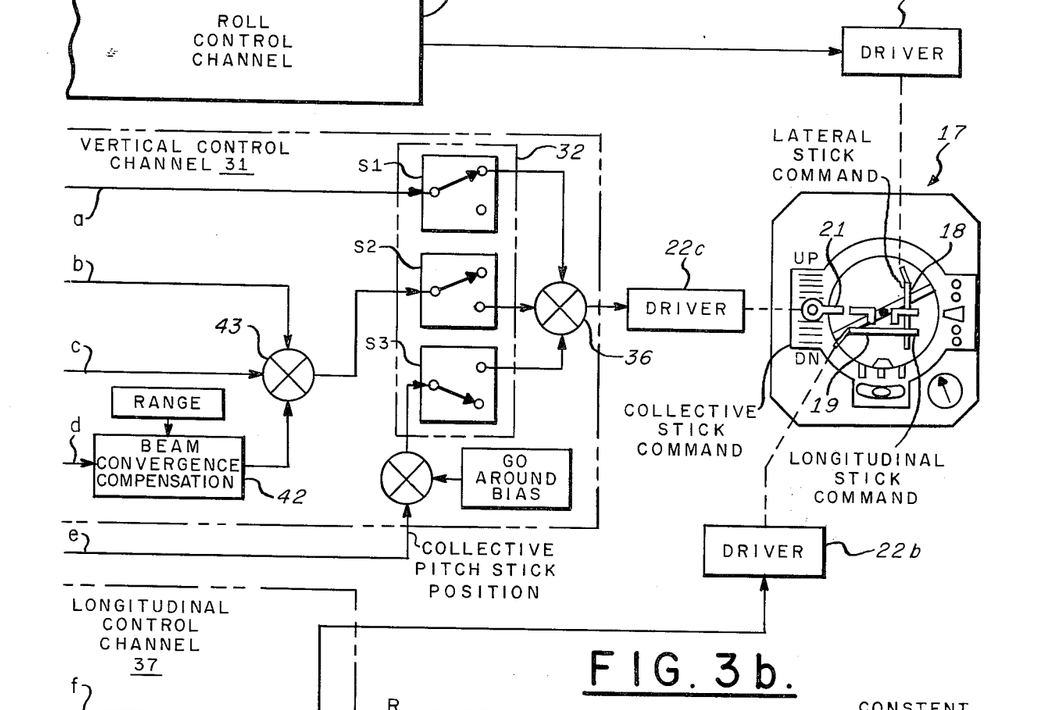

A system for controlling the craft in the foregoing manner will now be described with reference to FIGS. 3a and 3b. A Flight Director Indicator 17 which indicates to the pilot the collective and cyclic pitch stick motions required to fly the craft along a prescribed path includes the usual roll and pitch indicator bars 18 and 19 and an altitude pointer or cue 21 driven by respective drivers 22a, b and c which may be of the type disclosed in U.S. Pat. No. 3,577,195 issued to Charles E. Clift and assigned to the assignee of the present invention. The roll control channel is conventional and includes the usual computer 23 and mode selector 24 receiving input signals from a VOR/LOC receiver 26, heading select unit 27, course select unit 28 and the roll pickoff of a vertical gyro 29.

The altitude or vertical control channel 31 includes a mode selector 32 containing switches S1, S2 and S3. In the course of flight prior to capturing the glide slope beam, the switches S1 and S2 are normally in the up position and switch S3 is in the down position. Switch S1 couples an altitude error signal from a barometric altitude hold unit 33 through an amplifier 34 and rate circuit 44 into summing amplifiers 36 and 36a to driver 22c connected to the altitude pointer 21. In level flight, any deviation from the barometric altitude reference will provide an error signal to drive the altitude pointer such that appropriate corrective action by the pilot using the collective pitch stick will return the craft to the desired altitude and simultaneously restore the altitude pointer to its center position. In the event that the pilot desires to change altitude during cruise flight, the barometric altitude unit is simply disengaged until the craft reaches the new altitude at which the barometric altitude unit is re-engaged to provide an error signal indicative of deviation from the new altitutde. Alternatively, an altitude select knob could be provided to supply a bias signal indicative of desired altitude to summing amplifier 36a, thus allowing the pilot to select and change reference altitude at will. At the same time, the pitch attitude of the craft is controlled by means of a cyclic pitch stick in accordance with a speed selected by the pilot as will be described more fully hereinafter with reference to the longitudinal control channel 37. continuing with the description of the altitude control channel 31, for descent along the glide slope beam, switches S1 and S2 are moved either automatically or by the pilot to their respective down positions thereby disconnecting from the altitude pointer the barometric altitude error signal and in place thereof applying a glude slope displacement signal from glide slope receiver 38. The glide slope displacement signal is applied through amplifier 39, lag network 41 and compensation unit 42, which compensates for the glide slope beam convergence with decreasing altitude or range, into summing amplifier 43 where it combines with rate and acceleration damping signals derived respectively from rate network 44 coupled to the barometric altitude unit and the lag and washout networks 46, 47 coupled to vertical axis accelerometer 48. Beam convergence compensation is provided simply by decreasing the gain of the glide slope displacement signal in accordance with decreasing range to the terminal position. Thus, during descent the altitude pointer of the Flight Director Indicator deviates from its center position in proportion to the craft deviation from the center of the glide slope beam. Appropriate control motion of the collective pitch stick by the pilot returns the altitude pointer to zero, placing the craft back on the glide slope center line. In the event of a missed landing or wave-off from a ground controller, the pilot moves switch S2 to the upper position and switch S3 to the upper position thereby removing the glide slope displacement signal from the altitude pointer and applying instead a fixed bias go-around signal calling for a predetermined angle of ascent which is balanced out with an appropriate collective pitch stick motion by the pilot.

The longitudinal control channel 37 contains a pilot actuatable selector unit 49 for selecting a desired craft velocity during cruise flight prior to capturing the glide slope beam and likewise for selecting an initial velocity in the range, for example, of 40 to 120 knots during the initial portion of the glide slope descent. The signal provided by the programmed variable reference velocity unit 51 is set during these flight regimes so as to be greater than the signal corresponding to the maximum velocity selectable by the pilot. Hence, the least value select unit 52 passes the signal applied thereto from the desired velocity selector unit 49 and blocks the signal supplied from the programmed variable reference velocity unit 51. The selected reference velocity signal appearing at the output of the least value select unit in turn couples through lag network 53 and switch S4 in mode selector 54 to summing amplifier 56 where it is subtractively combined with a signal indicative of the actual craft speed supplied from airspeed sensor 57 through amplifier 58. The output of summing amplifier 56 is therefore an airspeed error signal representative of the difference between the indicated and pilot selected speeds. During normal cruise flight in a hold altitude condition, the altitude error signal from barometric altitude unit 33 may be also coupled into summing amplifier 56 through high-pass filter 59 and switch S5 in the mode selector 54 to provide damping in the longitudinal control channel. In other flight modes, the barometric altitude error signal is decoupled from the longitudinal control channel. The speed error signal at the output of summing amplifier 56 is applied to summing amplifier 61 where it combines with a pitch attitude trim signal derived from the pitch attitude pickoff of vertical gyro 29 by way of summing point 62, integrator 63 and amplifier 64. The output of summing amplifier 61 thus constitutes a drive signal which is applied through limiter 66 and summing amplifier 67 to the pitch indicator bar driver 22b. Hence, in normal cruise flight, any difference between the selected and actual speed causes the pitch indicator bar to deflect from its center position so as to call for corrective cyclic pitch stick motion by the pilot to pitch the craft as necessary to adjust the actual speed to become equal to the selected speed. Limiter 66 serves to limit the speed error signal to an appropriate amplitude to preclude excessive abrupt changes in pitch attitude of the craft. A pitch attitude signal from the vertical gyro is also added into summing amplifier 67 whereby when the craft speed has been properly adjusted, the pitch bar indicator is restored to its center position. The effect of the two signal paths for the attitude signal to be applied to summing amplifier 67 is the compensation for long term changes in equilibrium attitude required by the craft as it changes velocity. The gains of amplifiers 64 and 64a are adjusted so that in the long term, the net attitude component in the output of summing amplifier 67 is zero or near zero. Thus, the attitude signal is effectively "washed out" in the long term, thereby allowing the aircraft to achieve the long term attitude changes required to accurately follow the velocity reference signal. Further, the use of two attitude paths allows limiter 66 to positively limit the attitude command in both the long and short term.

In the go-around mode switch S4 is moved to the left side position and a preset speed bias command is applied to amplifier 56 for comparison with the actual speed signal.

The deceleration control feature of the invention will now be described. As previously explained with reference to FIG. 2, the deceleration program commences at a predetermined range (point X) from the terminal point to control the craft speed in such a manner that it will decrease from the value selected by the pilot during cruise or the initial part of the descent maneuver to a predetermined lower value which will be achieved either prior to reaching a prescribed altitude of say 100 feet or alternatively at the altitude of the hover or landing position in the case where continuous autopilot or instrument control is employed without takeover by the pilot. An open loop implementation of the deceleration program is accomplished in the apparatus of FIGS. 3a and 3b by means of the programmed variable reference velocity unit 51 providing an appropriately varying output commencing at a predetermined range point. This may be performed for instance by a motor actuated potentiometer driven through an appropriate cam arrangement or by an integrator having an appropriate discharge characteristic for achieving the intended result. In the case of an integrator, a signal of one polarity is applied to its input prior to reaching the predetermined range point to provide an output which exceeds the maximum signal value capable of being supplied by the pilot actuated desired velocity selector unit thereby assuring that the pilot selected desired velocity signal is operative for determining the craft speed before the predetermined range point is reached. At the predetermined range point, however, provision is made for decreasing the variable reference velocity signal in a prescribed manner. The predetermined range may be measured for instance by a vertically directed altimeter 68 in the case of a craft flying along a known glide slope angle. Thus, in the case of a vertically directed altimeter, at a given altitude the altimeter actuates switch 56 to its lower position whereby the input signal to the integration of the programmed variable reference velocity unit is reversed causing the integrator output to decrease.

Figure 5A:
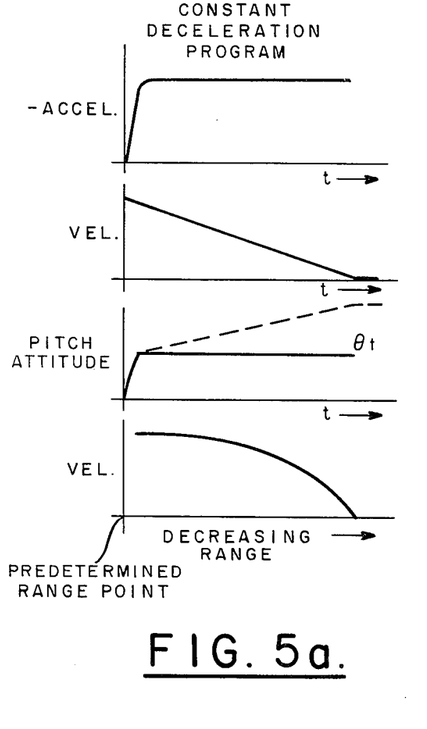
FIGS. 5a and 5b are parameter response curves useful in explaining the operation of the systems shown in FIGS. 3a and 3b and 4.

As explained hereinbefore, the deceleration program may be implemented with either constant or variable deceleration. In both cases the programmed variable reference velocity signal is varied in such a way as to assume control in place of the pilot selelcted desired velocity signal to reduce the craft speed in a predetermined manner in the course of descending along the glide slope beam. Curves relating to a constant deceleration program are shown in FIG. 5a while the curves of FIG. 5b represent a particular variable deceleration case in which the craft velocity is caused to decrease linearly as a function of decreasing range to the termination point as shown in the velocity versus range plot.

First consider the constant deceleration case. As shown in the figures, the step change in deceleration produces a linear variation of the craft velocity as a function of time resulting in a condition where the greatest changes in velocity occur in the final portion of the descent and are accompanied by continuously increasing pitch attitude above the pitch trim attitude $\theta_t$ as represented by the velocity versus range and pitch attitude versus time plots, respectively, of FIG. 5a. These flight conditions are achieved simply by varying the voltage at the output of the programmed variable reference velocity unit 51 as indicated in the velocity versus time plot of FIG. 5a. This can be implemented by designing the integrator of the programmed variable velocity unit to have a linear discharge characteristic. At some point down the glide slope from the predetermined point X, the programmed variable reference voltage will become less than the particular desired velocity signal selected by the pilot and thus be passed by the least value selector 52 to become the determining factor in controlling craft velocity. The operation is essentially the same as previously described for the cruising mode wherein the difference between the least value selected reference velocity signal and the indicated speed signal provide an error signal which drives the pitch bar of the Flight Director Indicator calling for appropriate longitudinal cyclic pitch stick motion by the pilot to alter the craft attitude so as to make the actual craft velocity equal to the instantaneously commanded reference velocity. A lower limit on the instantaneous reference velocity may be implemented simply by limiting the output of the least value select unit to a prescribed minimum value. It will be apparent that since the initial output voltage level of the programmed variable reference unit is set to be approximately equal to or slightly greater than the maximum value of the desired velocity selector unit, the precise point along the glide slope at which the programmed decreasing variable reference voltage becomes effective for controlling craft velocity will depend on the value of the pilot selected desired velocity.

Figure 5B:
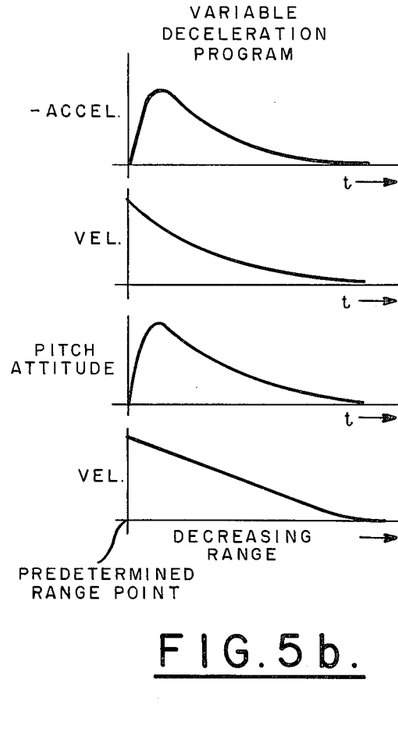

The variable deceleration program can be implemented in essentially the same manner as the aforedescribed constant deceleration control except that the integrator output of the variable reference velocity unit is caused to vary non-linearly as shown in the velocity versus time plot of FIG. 5b, that is, the integrator is designed to have an appropriate non-linear discharge characteristic. The magnitude of the change of the variable reference signal, however, in the early part of the deceleration program, is restricted so as not to cause excessive initial deceleration which could produce deleterious gravity loading on the craft. The advantage of this deceleration program is that the pitch attitude decreases close to zero as the termination point is approached, a condition which is more acceptable for pilot takeover.

Figure 6:
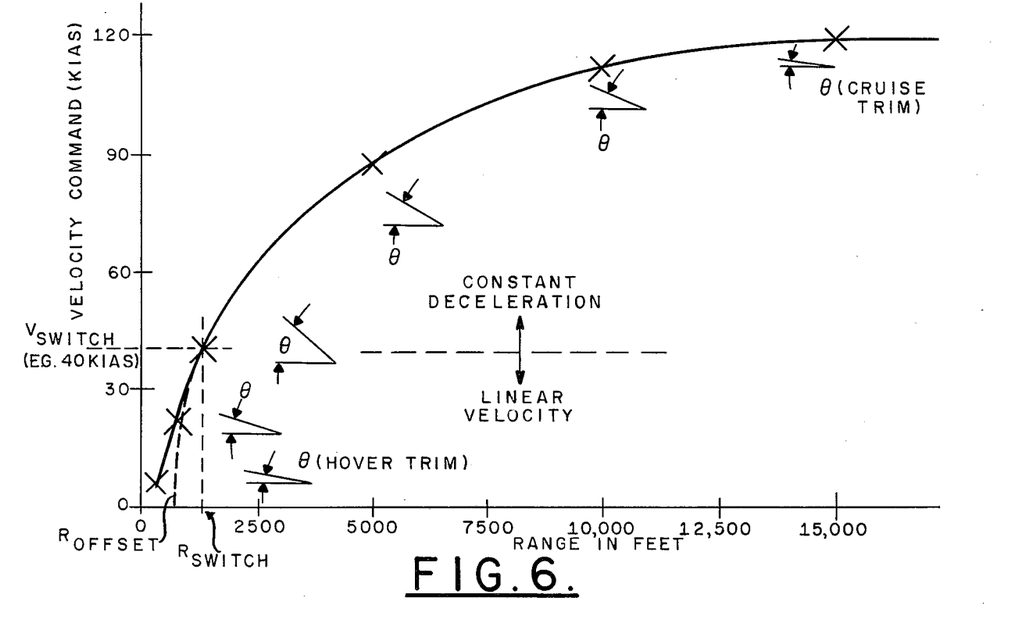
FIG. 6 is a graph of velocity versus range to the terminal point depicting a typical flight path for transition between constant and variable deceleration modes utilizing the apparatus of FIGS. 3a and 3b or FIG. 4.

To achieve the advantages of reduced gravity loading at the beginning of the deceleration program together with small pitch attitude near the end of the descent, the programmed reference voltage can be varied so as to utilize constant deceleration at the initial high altitude-high speed conditions with transition to variable deceleration at an appropriate lower velocity-low altitude condition for minimizing the pitch attitude prior to pilot takeover. Operation in this manner is illustrated by the curve of FIG. 6 which is a plot of craft velocity versus range to the termination point with the magnitude of the craft pitch attitude qualitatively depicted at various points. In this case, the constant deceleration mode was used from 120 knots down to 40 knots and thereafter a variable deceleration mode corresponding to a non-linear velocity as a function of time was used down to about 10 knots.

Figure 4:
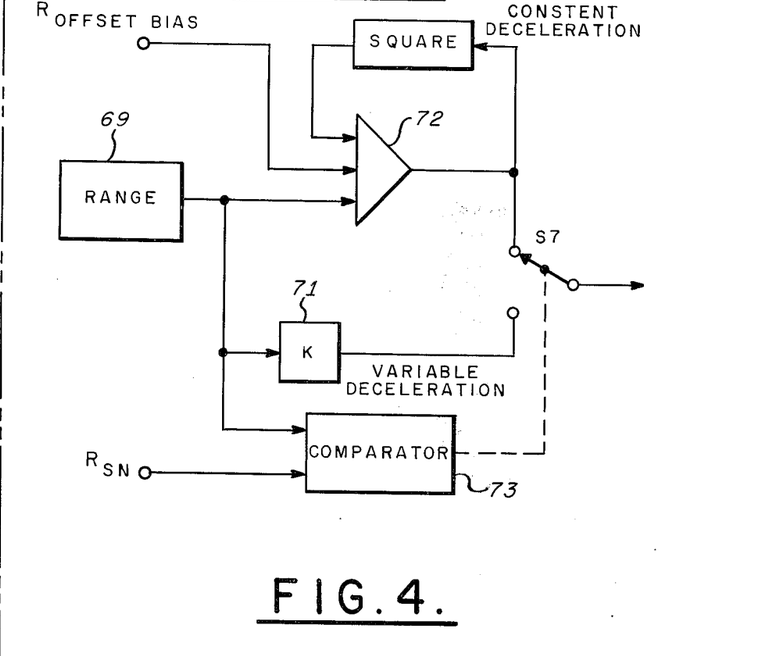
FIG. 4 is a block diagram of an alternative deceleration programming apparatus which may be used in the apparatus of FIGS. 3a and 3b.

The foregoing description of the deceleration programs made with reference to FIG. 3 relates to an open-loop system in the sense that the deceleration program is simply commenced at a predetermined range from the termination point without any further reference to range measurement. FIG. 4 illustrates a modified variable reference velocity system in which range or some function of range is used continuously for providing the programmed variable reference voltage of unit 51 in FIG. 3. The apparatus of FIG. 4 can thus be used in the apparatus of FIG. 3 in place of the programmed variable reference unit 51, switch S6 and vertically directed radar altimeter 68. In the case of variable deceleration control then, the output signal of range measuring unit 69 is applied through amplifier 71 to produce a signal conforming to the velocity versus range plot of FIG. 5b. This signal will then be applied to the least value select unit 52 through switch S7 closed in its lower position. In the case of the constant deceleration control, the output signal of the range measuring unit is applied through square root circuit 72 to provide an output voltage conforming to the velocity versus range plot of FIG. 5a. This signal is then applied to the least value select unit 52 through switch S7 closed in its upper position. A range offset bias signal is added into the square root circuit to account for the range at which the constant deceleration profile is terminated.

Where it is desired to combine the constant and variable deceleration control programs, switch S7 may be closed in its upper position to utilize the constant deceleration square root circuit voltage in the initial part of the descent. The variable deceleration signal at the output of the amplifier 71 can then be used in the terminal portion of the descent by actuating switch S7 to its lower position. Actuation of the switch is accomplished by a signal from comparator 73 which compares a signal indicative of the instantaneous range with a preset range switching voltage. As in the previously described open-loop system, the signal levels of the constant and variable deceleration programs must be matched at the switchover point.

It has been contended, in the foregoing discussion, that the varying reference signal can be generated either open-loop (as a function of time) or closed-loop (as a function of range). That this is the case can be confirmed utilizing the theory of calculus and differential equations. For instance, range R is related to acceleration profile a(t) by the simple differential equation- $$\frac{d^2R}{dt} = a(t)$$

This equation may be solved for expressions which give range as a function of time, and velocity as a function of time. These expressions may be solved in turn to give velocity as a function of range. Additionally, for difference velocity profiles, a system of differential equations may be created, which when solved simultaneously, considering the boundary conditions, yield expressions relating range and velocity to time. As above, these expressions may then be solved to provide an expression for velocity as a function of range.

As an example, it can be shown that for constant acceleration, $a(t) = K_1$.

$$V(t) = Kt$$

and $$V(R) = K\sqrt{R + C_1}$$

also, for $V(R) = K_2 R$ (i.e. velocity a linear function of range), $$V(t) = e^{Kt} + C_2$$

Those skilled in the art will readily recognize that since range velocity, acceleration and time are all mathematically related; either the open-loop (velocity a function of time) or the closed loop (velocity a function of range), or a combination, may be implemented to produce very similar deceleration profiles.

Further, it will be recognized that the deceleration could be achieved whether or not a source of glide slope information is present. In the absence of such information, height profiles could be generated in much the same manner as the velocity profiles discussed above.

While the invention has been described in its preferred embodiments, it is to be understood that the words which have been used are words of description rather than limitation and that changes within the purview of the appended claims may be made without departing from the true scope and spirit of the invention in its borader aspects.

We claim:

1. In an apparatus by means of which the flight of a V/STOL type craft may be controlled along a descent path to a hover or landing termination point, including a flight director device comprising means for providing a signal representative of actual craft velocity, means for providing a desired velocity signal variable in accordance with a predetermined velocity program from an initial value, selectable from a range of values representative of velocities at which the craft may be made to fly at a range greater than a predetermined range from the termination point, to a final value representative of a predetermined lower velocity to be attained substantially at said termination point, means responsive to the actual velocity and programmed desired velocity signals for producing an output indicative of craft attitude required to reduce the actual velocity of the craft in accordance with said velocity program, means for providing a signal indicative of a predetermined range to the termination point, and means responsive to the range indicative signal for initiating said velocity program.

2. The apparatus of claim 1 wherein the desired velocity signal is varied as a linear function of time to produce a constant deceleration of the craft.

3. The apparatus of claim 1 wherein the desired velocity signal is varied as a non-linear function of time such that the craft velocity linearly decreases without decreasing range to the termination point.

4. The apparatus of claim 1 wherein the means for providing a desired velocity signal includes means for varying the desired velocity signal as a linear function of time as the craft proceeds down the descent path from the predetermined range to a prescribed range point at which the desired velocity signal is therafter varied as a non-linear function of time so as to cause the craft velocity to decrease linearly with decreasing range to the termination point.

5. The apparatus of claim 1 including means for providing a signal representative of the craft pitch attitude and means for combining said signal representative of the craft pitch attitude with the actual velocity and variable desired velocity signals.

6. The apparatus of claim 5 wherein the means for providing a desired velocity signal includes means for varying the desired velocity signal as a linear function of time as the craft proceeds down the descent path from the predetermined range to a presribed range point at which the desired velocity signal is thereafter varied as a non-linear function of time so as to cause the craft velocity to decrease linearly with decreasing range to the termination point.

7. The apparatus of claim 6 including
means for providing a signal indicative of craft displacement from a glide slope beam representative of the desired descent path of the craft, and
means responsive to the glide slope displacement signal for producing an output representative of vertical motion required to maintain the craft on the glide slope beam.

8. Apparatus for controlling the flight of a V/STOL type craft along a descent path to a hover or landing termination point, comprising
means for providing a signal representative of a desired velocity, selectable from a range of desired velocity signal values, during the initial part of the descent at a range greater than a predetermined range from the terminal point,
means for providing a variable reference signal variable from an initial value representative of velocity at least equal to the maximum selectable desired velocity at a range greater than the predetermined range to a final value representative of a predetermined lower velocity,
means for varying the reference signal from the initial to the final value, as the craft proceeds along the descent path, commencing at the predetermined range from the termination point,
means for selecting as a reference signal from the desired velocity and variable reference velocity signals the signal which is instantaneously representative of lower velocity,
means for providing a signal representative of the actual velocity of the craft, and
means responsive to the actual velocity and selected instantaneous velocity signals for producing an output indicative of craft attitude required to reduce the actual velocity to the predetermined lower velocity substantially at said termination point.

9. The apparatus of claim 8 including means for providing a signal representative of the craft pitch attitude and means for combining said signal representative of the craft pitch attitude with the actual velocity and selected instantaneous reference velocity signals.

10. The apparatus of claim 9 including
means for providing a signal indicative of craft displacement from a glide slope beam representative of the desired descent path of the craft, and
means responsive to the glide slope displacement signal for producing an output representative of vertical motion required to maintain the craft on the glide slope beam.

11. The apparatus of claim 8 wherein the variable reference velocity signal is varied as a linear function of time to produce a constant deceleration of the craft.

12. The apparatus of claim 11 including
means for providing a signal representative of the craft pitch attitude to be combined with the actual velocity and selected instantaneous reference velocity signals,
means for providing a signal indicative of craft displacement from a glide slope beam representative of the desired descent path of the craft, and
means responsive to the glide slope displacement signal for producing an output representative of vertical motion required to maintain the craft on the glide slope beam.

13. The apparatus of claim 8 including means for continuously measuring the range to the termination point to provide the variable reference velocity signal as a linear function of range.

14. The apparatus of claim 13 including
means for providing a signal representative of the craft pitch attitude to be combined with the actual velocity and selected instantaneous reference velocity signals,
means for providing a signal indicative of craft displacement from a glide slope beam representative of the desired descent path of the craft, and
means responsive to the glide slope displacement signal for producing an output representative of vertical motion required to maintain the craft on the glide slope beam.

15. The apparatus of claim 8 wherein the variable reference velocity signal is varied as a non-linear function of time such that the craft velocity decreases linearly with decreasing range to the termination point.

16. The apparatus of claim 15 including
means for providing a signal representative of the craft pitch attitude to be combined with the actual velocity and selected instantaneous reference velocity signals,
means for providing a signal indicative of craft displacement from a glide slope beam representative of the desired descent path of the craft, and
means responsive to the glide slope displacement signal for producing an output representative of vertical motion required to maintain the craft on the glide slope beam.

17. The apparatus of claim 8 wherein the means for providing a signal representative of a desired velocity signal includes means for varying said signal as a linear function of time as the craft proceeds down the descent path from the predetermined range to a prescribed range point at which the desired velocity signal is thereafter varied as a non-linear function of time so as to cause the craft velocity to decrease linearly to the termination point.

18. The apparatus of claim 17 including
means for providing a signal representative of the craft pitch attitude to be combined with the actual velocity and selected instantaneous reference velocity signals,
means for providing a signal indicative of craft displacement from a glide slope beam representative of the desired descent path of the craft, and
means responsive to the glide slope displacement signal for producing an output representative of vertical motion required to maintain the craft on the glide slope beam.

19. The apparatus of claim 8 including
means for providing a measure of range to the termination point to vary the variable reference velocity signal as a function of square root of range from the predetermined range to a prescribed range point at which the variable reference velocity signal is thereafter varied as a linear function of range to the termination point.

* * * * *